DIGITAL FREQUENCY SHIFT CONVERTER

Filed Aug. 9, 1967 3 Sheets-Sheet 1

INVENTORS.
DON I. HIMES
BY FRANK V. ALTAMURO
Charles L. Johnson Jr.
ATTORNEY

INVENTORS.
DON I. HIMES
FRANK V. ALTAMURO
BY Charles L. Johnson Jr.
ATTORNEY

INVENTORS.
DON I. HIMES
BY FRANK V. ALTAMURO
Charles L. Johnson Jr.
ATTORNEY 3,526,717

DIGITAL FREQUENCY SHIFT CONVERTER

Don I. Himes, Falls Church, Va., and Frank V. Altamuro, Wyckoff, N.J., assignors to International Telephone and Telegraph Corporation, Nutley, N.J., a corporation of Maryland Filed Aug. 9, 1967, Ser. No. 659,409
Int. Cl. H04l *27/14*
U.S. Cl. 178—88 7 Claims

ABSTRACT OF THE DISCLOSURE

A system is described for keying a teletype line in which a frequency discriminator produces a frequency determination in the time domain while a seven bit shift register is employed for integration in order to eliminate bias distortion and a detector activates a keyer for the teletype loop.

BACKGROUND OF THE INVENTION

Carrier-frequency-shift telegraphy is a method of wireless telegraph transmission in which the mark impulse of the telegraph code is transmitted at one radio frequency and the space impulse is transmitted at another radio frequency differing from the "mark" frequency by an audio frequency known as the "frequency shift."

It is normal practice to transmit the "mark" frequency higher than the assigned transmission frequency by ½ the frequency-shift, and the "space" frequency lower by ½ the frequency-shift.

One Unit Specification for a frequency shift keyer Teletype Converter involves the following:

| | Total shift, c.p.s. |
|---|---|
| 1000 c.p.s. CF shift | 10–100 |
| 2550 c.p.s. CF shift | 200–1000 |

Past frequency shift keyer systems have been of the analog type. In analog systems the audio signal is filtered amplified, limited and fed into an audio discriminator which transforms, the frequency shift signal into D.C. pulses. These pulses are filtered and fed into the keyer unit to key the teletypewriter loop.

SUMMARY OF THE INVENTION

This invention is directed generally to carrier frequency-shift telegraphy and more particularly to a frequency shift converter in which digital techniques are utilized. More specifically a frequency discriminator, integrator and keyer detection section provide the digital construction for a frequency-shift telegraphy drive.

DESCRIPTION OF THE PREFERRED EMBODIMENT

Figure 1:
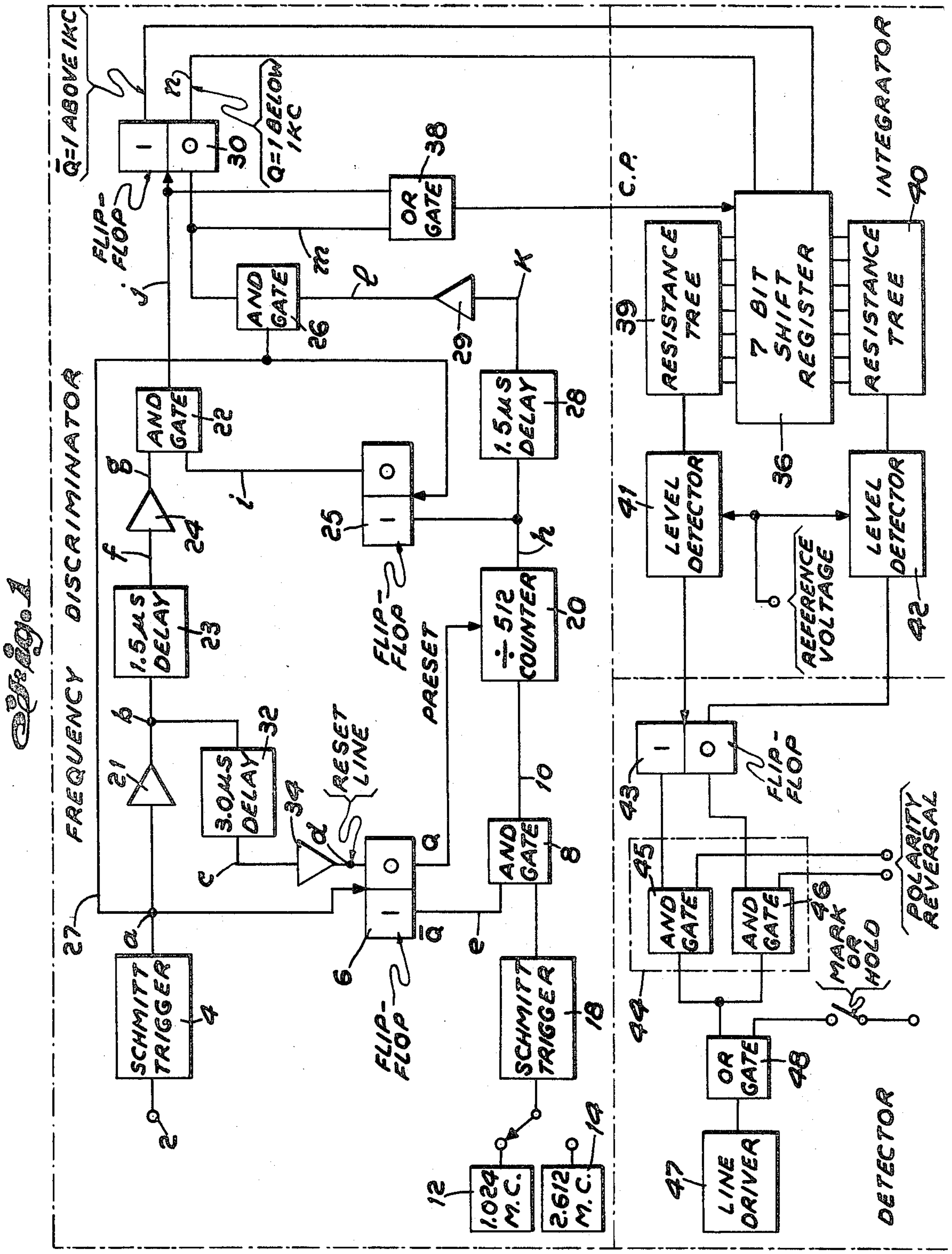
FIG. 1 is a schematic block diagram of the preferred embodiment of the invention.
Figure 2:
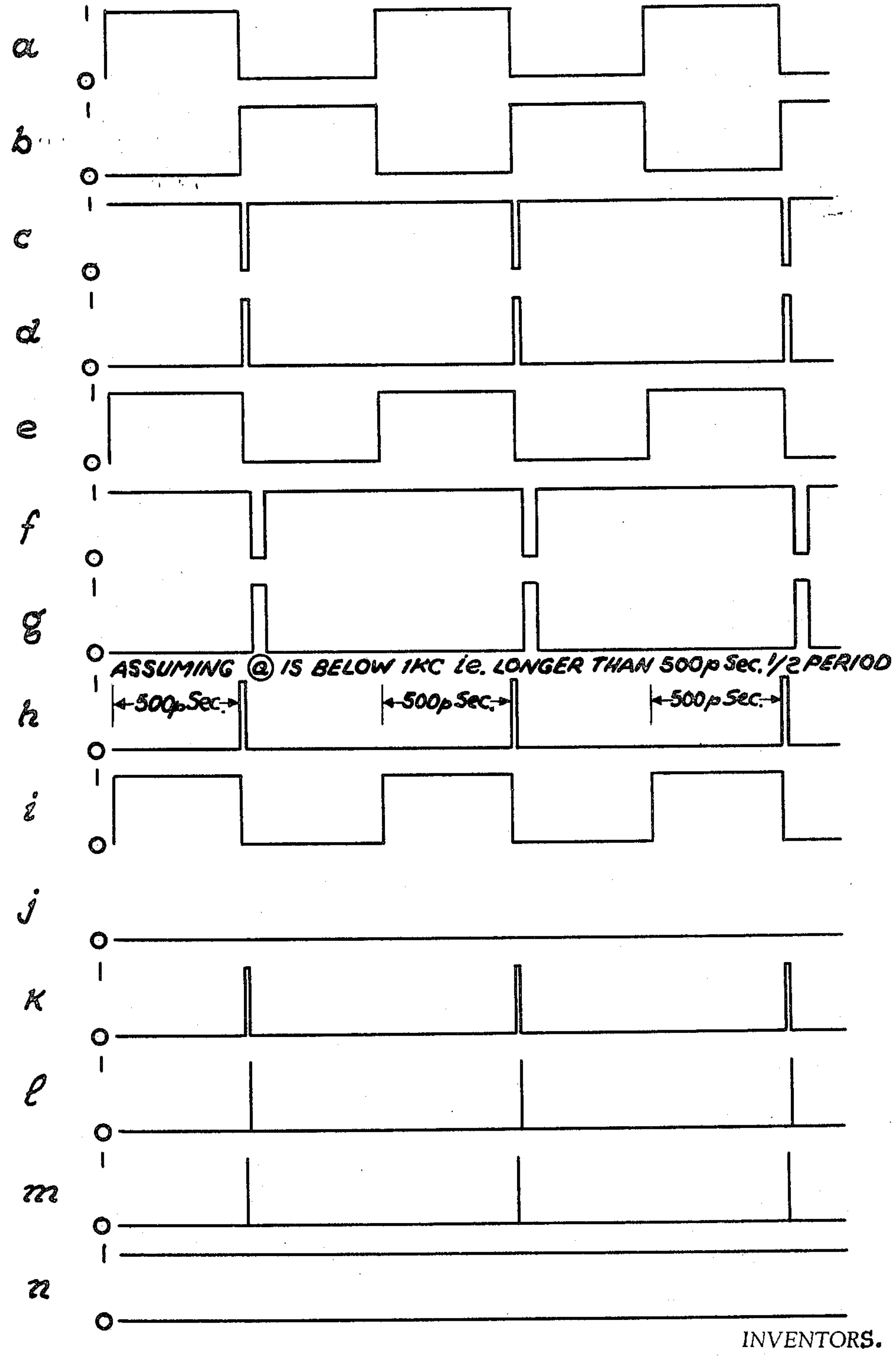
FIG. 2 illustrates voltage waveforms at various points in the schematic of FIG. 1.

The Digital Frequency Shift Converter can be subdivided into three sections; a frequency discriminator, an integrator and a keyer detection section.

The frequnecy discriminator portion of the counter produces a frequency determination in the time domain. The frequency shift audio signal input at terminal 2 is squared by a Schmitt trigger circuit 4. The start of the audio shift pulse, by way of flip-flop 6 and gate 8 enables the reference clock line 10 from one of the two oscillators 12 and 14 by way of switch 16 and Schmitt trigger 18. The clock is then counted down by the counter 20 to produce a pulse at a time the zero crossover of the desired audio center frequency should occur. The audio shift pulse from terminal 2 is inverted by the inverter 21 so that the positive rise time of the pulse represents the zero crossover point. A comparison is now made at the gate 22 between the shift pulse from the inverter 21 delay 23 and inverter 24, and the counted down clock pulse from the counter 20 and flip-flop 25. Comparison is also made at gate 26 between the shift pulse on conductor 27 and the counted down pulse from the delay 28 and inverter 29. The pulse that arrives first disables the gate of the other pulse and triggers the steering flip-flop 30. The shift frequency is above the desired center frequency when the audio shift pulse from terminal 2 triggers the steering flip-flop 30 and below when the clock pulse through switch 17 triggers the flip-flop 30. The zero crossover of the audio pulse resets the input flip-flop 6 by way of delay 32 and isolator 34, which disables the clock line 10. Therefore, a frequency determination is made for every cycle.

The audio center frequencies that are employed in this design are 1000 c.p.s. with a total shift of 10 to 200 c.p.s. and 2550 c.p.s. with a total shift of 200 to 1000 c.p.s. The unit can be easily changed for other audio frequencies. This can be accomplished by changing the clock frequency via a crystal or by changing the counter divider number.

Delay is inserted in each line prior to the gate to provide for a frequency slot. A 1.5 microsecond delay provide a ±3 cycles-second slot for 1000 cycles/second center frequency and a ±20 cycles/second slot for a 2550 cycles/second center frequency.

In the integrator portion of the converter a seven bit shift register 36 is employed for integration in order to eliminate bias distortion. The audio pulse and the reference clock pulse are fed into an OR gate 38 and function as the shift register clock. Ones "1"s or zeros "0"s are steered on to the register by the steering flip-flop 30. "Ones" indicate the shift frequency is above the center frequency and zeros indicate the shift frequency is below the center frequency.

The seven outputs and their compliments are combined through trees 39 and 40 and fed to their corresponding level detectors 41 and 42. The level detectors are set to trigger on the fifth level. Therefore a judgment of 5 out of 7 ones or zeros indicate either a mark or a hold. The ability to weight the judgments can be achieved by changing the number of bits in the register or by changing the trigger level of the level detector.

Figures 3, 4, 5:
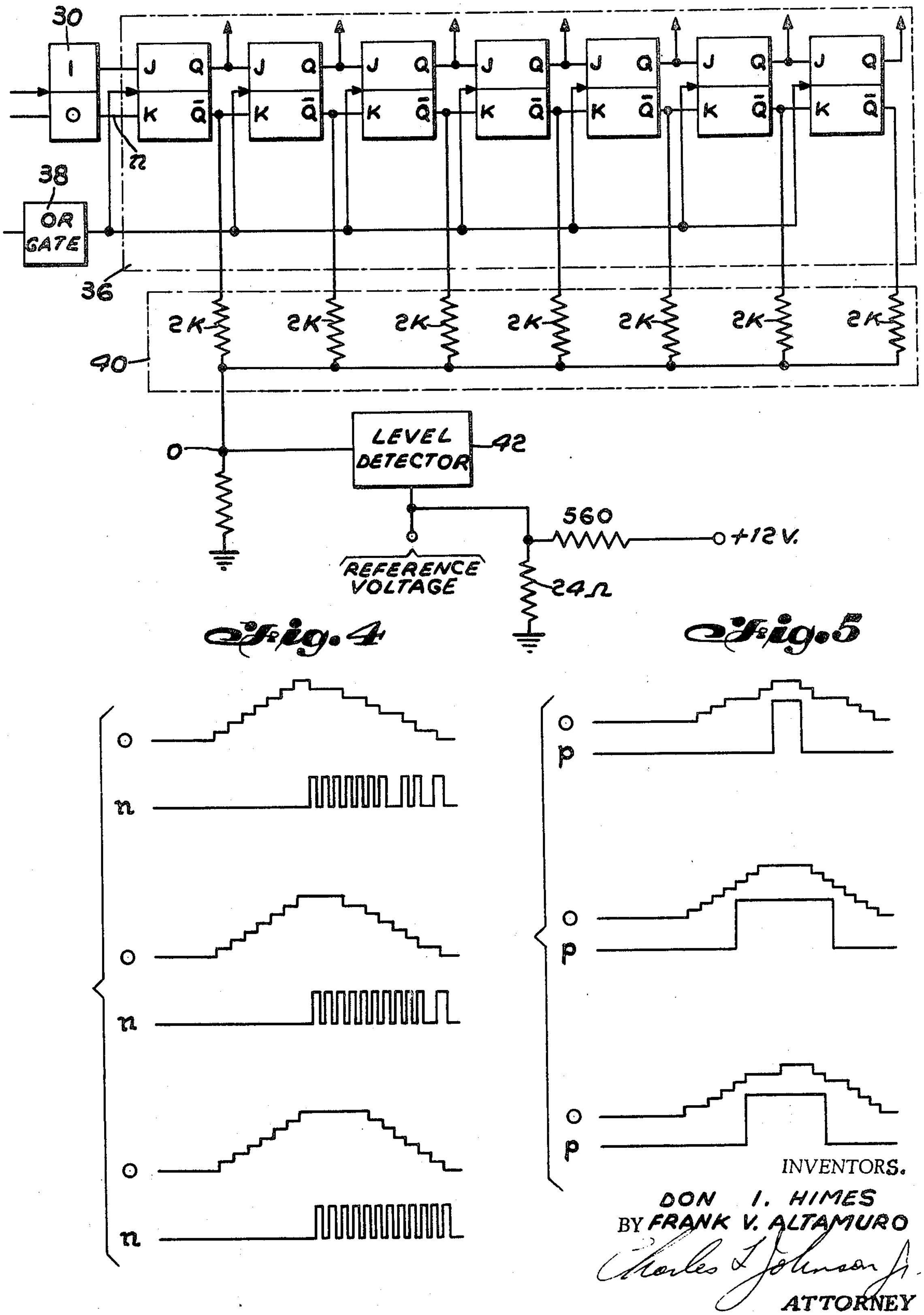
FIG. 3 is a schematic of one shift register and resistance tree which may be used in the practice of the invention.
FIG. 4 illustrates the waveforms taken from the steering pulse train and shift register of FIG. 1.
FIG. 5 illustrates the output of the shift register and the level detector.

FIG. 3 illustrates in more detail the arrangement of the shift register 36, resistance tree 40 and level detector 42. The outputs on conductor *n*, from the steering flip-flop 30, are fed to the shift register 36. These are shown graphically in FIG. 4 as the *n* waveforms.

The resistance tree 40 provides a means for adding the signals from the shift register 36 so that different signal levels exist at point *o* depending on how many of the shift register flip-flops are in a given condition. Line *o* of FIGS. 4 and 5 illustrate the waveforms resulting from the shift of the signals through the shift register 36.

The level detector 42 responds to the resistance tree 40 to provide an output representative of the mark or space code information represented by the frequencies of the received input signals. The output of the level detector 42 appears at point *p* of FIG. 1 and the waveforms are illustrated in FIG. 5. The level detector may be any of the well-known types, one such being the high speed differential comparator of Fairchild Semiconductor designated μa. 710 or 711. As may be seen from FIG. 5 the level detector is set to respond at the amplitude of 5 units out of 7. In other words a low level *p* signal is generated by the level detector until 5 units of *o* signal inputs are received. This is equivalent to 5 of the shift register flip-flops being in the same condition so that a space or mark representation is generated on a 5 or more out of 7 signals.

The detector means represented by the flip-flops 43 and other elements prior to the line driver 47 merely provides a signal at the communication device 47 representative of the mark or space code information.

In the detector portion of the converter the output of the level detectors are fed to a flip-flop 43 where the information is retained until the next judgment is made. The outputs of flip-flop 43 are fed to an AND gate circuit which provides for polarity reversal through external control as a means of altering the output for a given input. The output of the AND gates 45 and 46 are fed to a line driver 47 through an OR gate 48 to key the teletypewriter loop. A voltage can be fed back from the teletypewriter to the OR gate 48 to keep the teletypewriter from chattering when no signal is being transmitted.

The above describes one embodiment of the invention only and it should be understood that variations may be devised without departing from the invention.

What is claimed is:

1. In a carrier frequency shift telegraphy system a frequency shift converter comprising:

a frequency discriminator for producing a frequency determination in the time domain including:

a frequency shift audio signal source, means responsive to the audio signal source for squaring the frequency shift audio signal, a reference clock responsive to initiation by the start of the audio shift signal, countdown means associated with the reference clock to produce a pulse at a time the zero crossover of a desired center frequency of the frequency shift audio signal source, means to invert the audio shift pulse so the positive rise time represents the zero crossover point, gate means associated with each of the shift and clock pulses, comparing means responsive to the first to occur of the shift pulse and the counted down clock pulse for disabling the gate of the second to occur pulse, a steering flip-flop responsive to the first to occur of the shift or clock pulses, the shift frequency being above the desired center frequency when the audio shift pulse triggers the steering flip-flop and below when the clock pulse triggers the flip-flop, reset means responsive to the zero crossover of the audio pulse for disabling a clock output gate whereby a frequency determination is made for every cycle, delay means coupled to the shift and clock pulse gate means to provide a frequency slot;

Integrator means responsive to the frequency discriminator including:

a seven bit shift register for integration in order to eliminate bias distortion, an OR gate interconnected between the shift register and frequency discriminator so the audio and clock pulses from the frequency discriminator function as the shift register clock, connecting means between the integrator shift register and the frequency discriminator steering flip-flop whereby ones "1"s or zeros "0"s are steered on to the shift register by the steering flip-flop with ones indicating the shift frequency is above the center frequency and zeros indicating the shift frequency is below the center frequency, two resistive tree means responsive to the seven outputs and complements of the seven bit shift register, two level detectors responsive respectively to the two resistive tree means, the level detectors being set to trigger on the fifth level, a judgment of 5 out of 7 ones or zeros indicating either a mark or a hold, the ability to weight the judgments being achieved by changing the number of bits in the register or by changing the trigger level of the level detector; and Detector means including:

a detector flip-flop responsive to the integrator level detectors for retaining information until the next judgment is made, two AND gates responsive to the detector flip-flop and external control for providing polarity reversal, an OR gate having its inputs connected to the outputs of the last mentioned two AND gates, and a line driver responsive to the last mentioned OR gate and connected to a teletypewriter loop for driving the loop with either a mark or hold signal.

2. A frequency shift converter comprising:

a frequency shift audio input;

means responsive to said input to produce an audio frequency shift pulse;

clock means responsive to said audio frequency shift pulse to produce a clock pulse at the time of the zero crossover of a desired center audio shift frequency;

comparison means coupled to compare said shift pulse and said clock pulse and to trigger a steering flip-flop;

said steering flip-flop to be triggered by said shift pulse when the shift frequency is above the desired center frequency and to be triggered by said clock pulse when the shift frequency is below the said desired center frequency;

integrator means coupled to said comparison means and steering flip-flop including a shift register and level detector to determine, upon the simultaneous occurrence of a predetermined number of shift register outputs, the number of shift frequencies above and below the center frequency indicating a mark or space signal; and detector means coupled to said integrator means for detecting the mark or space signal for driving a communication device.

3. The converter of claim 2 including an inverter coupled to invert said audio shift pulse so that the positive rise time represents the zero crossover point.

4. The converter of claim 3 including reset means coupled to the output of said inverter to disable said clock means, so that a frequency determination is made for every cycle.

5. The converter of claim 4 wherein said integrator mans includes a 7-bit shift register coupled to said steering flip-flop.

6. The converter of claim 5 wherein said integrator includes two level detectors coupled by resistive means to said 7-bit register, said detectors responsive to a fifth level, indicating a judgment of 5 out of 7 ones or zeros determining a mark or space.

7. The converter of claim 6 including a detector flip-flop responsive to the level detectors for retaining information until the next judgment is made.

References Cited

UNITED STATES PATENTS

| | | | |
|---|---|---|---|
| 3,121,197 | 2/1964 | Irland | 325—320 |
| 3,230,457 | 1/1966 | Soffel | 178—66 |
| 3,244,986 | 4/1966 | Rumble | 328—140 |

ROBERT L. GRIFFIN, Primary Examiner

B. V. SAFOUREK, Assistant Examiner

U.S. Cl. X.R.

325—320; 328—140